United States Patent
Fujii et al.

(10) Patent No.: US 12,098,656 B2
(45) Date of Patent: Sep. 24, 2024

(54) STATOR VANE ASSEMBLY OF GAS TURBINE, STATIONARY MEMBER SEGMENT, AND METHOD OF PRODUCING STATOR VANE ASSEMBLY OF GAS TURBINE

(71) Applicant: MITSUBISHI HEAVY INDUSTRIES, LTD., Tokyo (JP)

(72) Inventors: Takashi Fujii, Kanagawa (JP); Satoshi Hada, Kanagawa (JP); Susumu Wakazono, Kanagawa (JP); Keita Takamura, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/277,635

(22) PCT Filed: Mar. 16, 2022

(86) PCT No.: PCT/JP2022/011781
§ 371 (c)(1),
(2) Date: Aug. 17, 2023

(87) PCT Pub. No.: WO2022/202510
PCT Pub. Date: Sep. 29, 2022

(65) Prior Publication Data
US 2024/0133305 A1 Apr. 25, 2024
US 2024/0229661 A9 Jul. 11, 2024

(30) Foreign Application Priority Data

Mar. 23, 2021 (JP) .................... 2021-048341

(51) Int. Cl.
*F01D 9/04* (2006.01)
*F02C 7/18* (2006.01)

(52) U.S. Cl.
CPC .............. *F01D 9/042* (2013.01); *F02C 7/18* (2013.01); *F05D 2220/32* (2013.01); (Continued)

(58) Field of Classification Search
CPC .......... F01D 9/042; F01D 25/246; F02C 7/18; F05D 2220/32; F05D 2230/60; F05D 2240/12; F05D 2260/20
See application file for complete search history.

(56) References Cited

U.S. PATENT DOCUMENTS 4,187,054 A * 2/1980 Landis, Jr. ............... F01D 5/18
   415/115
5,167,485 A * 12/1992 Starkweather ........ F01D 11/005
   415/138

(Continued)

FOREIGN PATENT DOCUMENTS

JP  11-125102      5/1999
JP  2000-282806    10/2000
WO  2016/152573    9/2016

OTHER PUBLICATIONS

International Search Report issued May 31, 2022 in International Application No. PCT/JP2022/011781.

*Primary Examiner* — David E Sosnowski
*Assistant Examiner* — Theodore C Ribadeneyra
(74) *Attorney, Agent, or Firm* — Wenderoth, Lind & Ponack, L.L.P.

(57) ABSTRACT

A stator vane assembly of a gas turbine includes: a stationary member formed to have an annular shape; and a plurality of stator vane segments each including a shroud and a vane body, the plurality of stator vane segments disposed along a circumferential direction of the stationary member at a radially inner side of the stationary member such that a cavity is disposed between the shrouds and the stationary member and the shrouds are disposed adjacent to one (Continued)

another in the circumferential direction of the stationary member. The stationary member has a hole which penetrates through the stationary member from a radially outer side toward the radially inner side, and a center axis of the hole is oriented toward a circumferential-direction end portion of the shroud.

10 Claims, 10 Drawing Sheets

(52) U.S. Cl.
CPC ...... *F05D 2230/60* (2013.01); *F05D 2240/12* (2013.01); *F05D 2260/20* (2013.01)

(56) References Cited

U.S. PATENT DOCUMENTS

| | | | | |
|---|---|---|---|---|
| 6,050,776 | A * | 4/2000 | Akagi | F01D 5/22 |
| | | | | 415/138 |
| 6,183,192 | B1 | 2/2001 | Tressler et al. | |
| 6,592,326 | B2 * | 7/2003 | Marx | F01D 9/041 |
| | | | | 415/208.2 |
| 11,415,007 | B2 * | 8/2022 | Whittle | F01D 5/188 |
| 2004/0258517 | A1 * | 12/2004 | Naik | F01D 25/12 |
| | | | | 415/116 |
| 2007/0059178 | A1 * | 3/2007 | Shapiro | F01D 11/08 |
| | | | | 416/181 |
| 2012/0134781 | A1 * | 5/2012 | Khanin | F01D 5/187 |
| | | | | 415/115 |
| 2018/0045060 | A1 | 2/2018 | Matsuo et al. | |
| 2018/0355798 | A1 * | 12/2018 | Mason, III | F02C 7/12 |
| 2019/0078514 | A1 * | 3/2019 | Eastwood | F01D 11/24 |
| 2020/0256195 | A1 * | 8/2020 | Khoun | F01D 11/003 |

\* cited by examiner

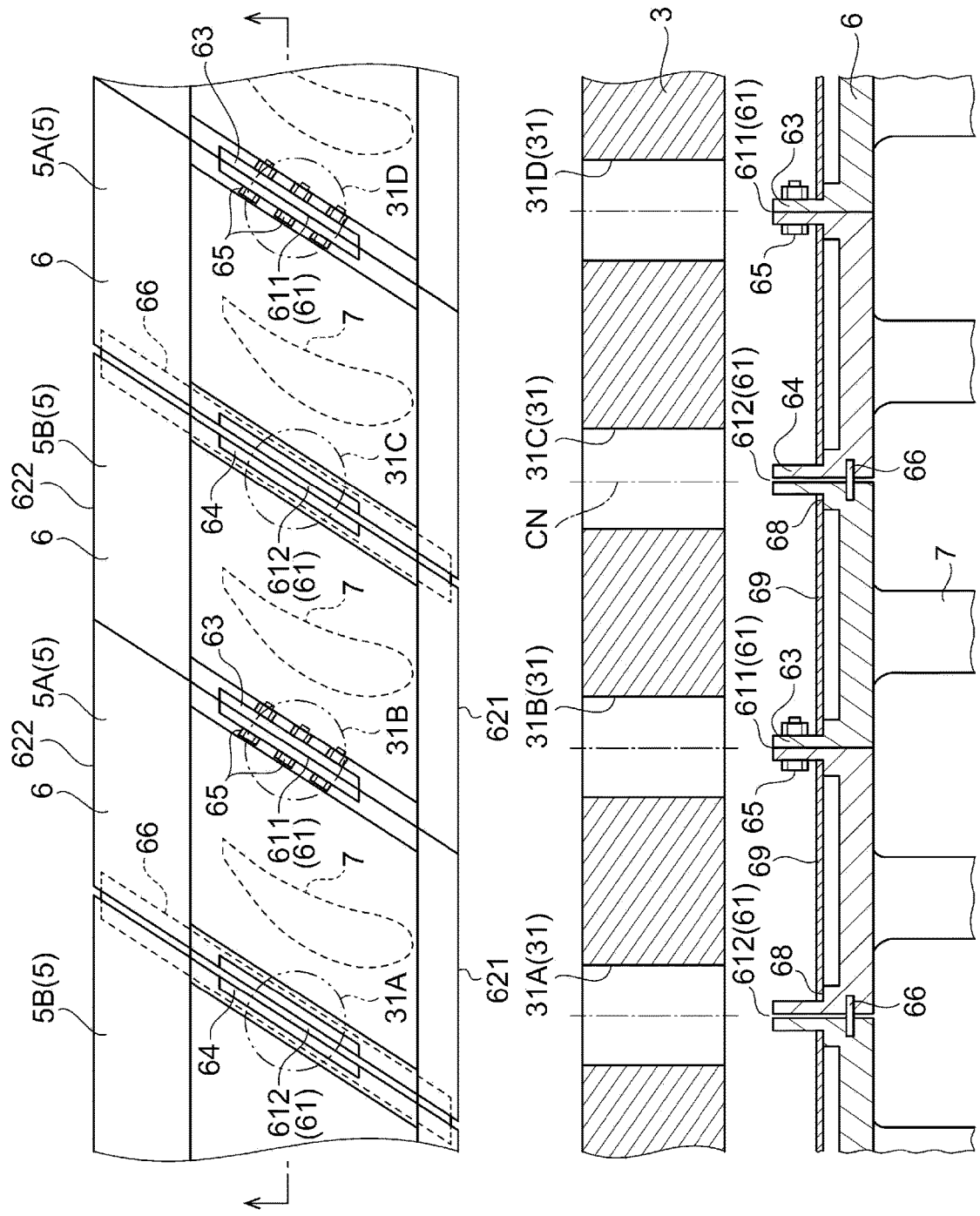

STATOR VANE ASSEMBLY OF GAS TURBINE, STATIONARY MEMBER SEGMENT, AND METHOD OF PRODUCING STATOR VANE ASSEMBLY OF GAS TURBINE

TECHNICAL FIELD

The present disclosure relates to a stator vane assembly of a gas turbine, a stationary member segment, and a method of producing a stator vane assembly of a gas turbine.

The present application claims priority based on Japanese Patent Application No. 2021-048341 filed on Mar. 23, 2021 with the Japanese Patent Office, the contents of which are incorporated herein by reference.

BACKGROUND ART

Patent Document 1 discloses a cooling air passage penetrating through the inner casing of a turbine casing from the radially outer side toward the radially inner side. The cooling air after passing through the cooling air passage is utilized in cooling of a stator vane stage disposed inside the turbine casing.

CITATION LIST

Patent Literature

Patent Document 1: WO2016/152573A

SUMMARY

Problems to be Solved

Meanwhile, the stator vane stage disclosed in Patent Document 1 includes a plurality of stator vanes arranged in the circumferential direction, and thus heated from two sides, that is, the inner circumferential surface of the plurality of stator vanes (shroud) and the adjacent end surfaces (circumferential-direction end surfaces) of the plurality of stator vanes (shroud) are heated at the same time by combustion gas flowing through the combustion gas flow passage. The temperature of the part heated from two sides as described above tends to increase readily, and thus requires more cooling than other parts.

However, the configuration disclosed in Patent Document 1 does not have a structure for distributing cooling air intensively to the part heated from two sides, and thus it is difficult to cool the part heated from two sides more effectively than the other parts.

The present disclosure has been made in view of the above problem, and an object is to provide a stator vane assembly, a stationary member segment, and a method of producing a stator vane assembly of a gas turbine capable of effectively cooling the part heated from two sides by combustion gas.

Solution to the Problems

To solve the above problem, a stator vane assembly of a gas turbine according to the present disclosure includes: a stationary member formed to have an annular shape; and a plurality of stator vane segments each including a shroud and a vane body, the plurality of stator vane segments disposed along a circumferential direction of the stationary member at a radially inner side of the stationary member such that a cavity is disposed between the shrouds and the stationary member and the shrouds are disposed adjacent to one another in the circumferential direction of the stationary member. The stationary member has a hole which penetrates through the stationary member from a radially outer side toward the radially inner side, and a center axis of the hole is oriented toward a circumferential-direction end portion of the shroud.

Furthermore, a stationary member segment of a gas turbine according to the present disclosure is a stationary member segment constituting a stationary member which is formed to have an annular shape and divided in a circumferential direction of the stationary member. A plurality of holes penetrating through the stationary member from a radially outer side toward a radially inner side are disposed in the circumferential direction of the stationary member segment. The plurality of holes include a first hole and a second hole disposed at different angles from one another with respect to a radial direction of the stationary member, and the second hole is inclined to a side of a division surface of the stationary member segment toward the radially inner side of the stationary member.

According to the present disclosure, a method of producing a stator vane assembly of a gas turbine is a method of producing a stator vane assembly of a gas turbine including: a stationary member formed to have an annular shape; and a plurality of stator vane segments each including a shroud and a vane body, the plurality of stator vane segments disposed along a circumferential direction of the stationary member at a radially inner side of the stationary member such that a cavity is disposed between the shrouds and the stationary member and the shrouds are disposed adjacent to one another in the circumferential direction of the stationary member. The method includes: arranging the stator vane segments such that a center axis of a hole disposed on the stationary member which penetrates through the stationary member from a radially outer side toward the radially inner side is oriented toward a circumferential-direction end portion of the shroud.

Advantageous Effects

According to at least one embodiment of the present disclosure, it is possible to effectively cool the circumferential-direction end portions of the shrouds.

BRIEF DESCRIPTION OF DRAWINGS

FIG. 6 is an enlarged developed view showing a part of the stator vane assembly of a gas turbine depicted in FIG. 5.

DETAILED DESCRIPTION

Hereinafter, with reference to the attached drawings, a stator vane assembly of a gas turbine, a stationary member, and a method for producing a stator vane assembly of a gas turbine will be described. It is intended, however, that unless particularly identified, dimensions, materials, shapes, relative positions and the like of components described in the embodiments shall be interpreted as illustrative only and not intended to limit the scope of the present invention.

Figure 1:
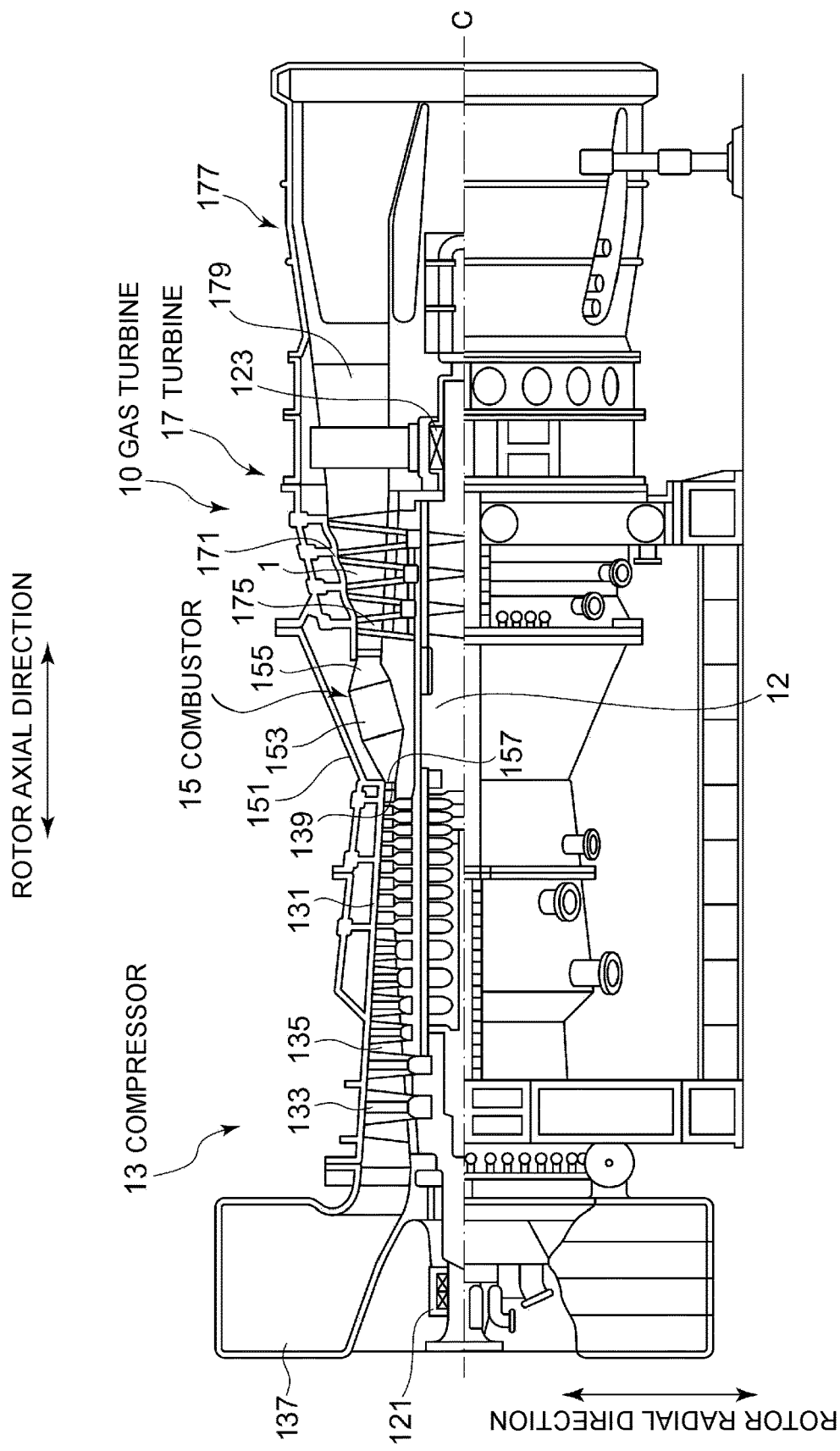
FIG. 1 is a schematic diagram of a gas turbine to which a stator vane assembly of a gas turbine according to an embodiment is applied.

As depicted in FIG. 1, the gas turbine 10 including a stator vane assembly 1 of a gas turbine according to an embodiment includes a compressor 13, a plurality of combustors 15, and a turbine 17. The gas turbine 10 includes a rotor shaft 12 being a rotational shaft disposed so as to penetrate through the compressor 13 and the turbine 17, and the plurality of combustors 15 are disposed around the rotor shaft 12. The compressor 13, the plurality of combustors 15, and the turbine 17 are disposed sequentially from the upstream side toward the downstream side of the flow direction of air along the axis C of the rotor shaft 12.

In the following description, the axial direction of the rotor shaft 12 is referred to as the rotor axial direction, the circumferential direction centered at the axis of the rotor shaft 12 is referred to as the rotor circumferential direction, and the direction orthogonal to the axis of the rotor shaft 12 is referred to as the rotor radial direction.

The compressor 13 is capable of producing compressed air utilizing rotation of the rotor shaft 12. The compressor 13 includes a compressor casing 131, a plurality of stages of compressor stator vanes 133, and a plurality of stages of compressor rotor blades 135. The compressor casing 131 is formed to have a cylindrical shape, the rotor shaft 12 penetrates through the inside of the compressor casing 131, and the compressor casing 131 has a cylindrically shaped space (casing) which accommodates the compressor stator vanes 133 and the compressor rotor blades 135. Furthermore, the compressor casing 131 has an intake port 137 at the upstream side of the flow direction of air, and a discharge outlet 139 at the downstream side of the flow direction of air. The intake port 137 is capable of taking in air to the inside of the compressor casing 131 from the upstream side of the flow direction of air. The discharge outlet 139 is formed to have an annular shape centered at the rotor shaft 12, and capable of discharging compressed air produced by the compressor 13.

The compressor stator vanes 133 are fixed to the inner circumference of the compressor casing 131, in a state of being arranged in the rotor axial direction and the rotor circumferential direction centered at the axis of the rotor shaft 12. The compressor rotor blades 135 are fixed to the outer circumference of the rotor shaft 12, in a state of being arranged in the rotor axial direction and the rotor circumferential direction centered at the axis of the rotor shaft 12 so as to be positioned alternately with the compressor stator vanes 133 in the rotor axial direction.

Each of the plurality of combustors 15 is capable of producing combustion gas by utilizing compressed air produced by the compressor 13. It is possible to supply a fuel to the combustors 15 with compressed air, and combustion gas is produced through combustion of the fuel. The plurality of combustors 15 are disposed inside a combustor casing 151. The combustor casing 151 is formed to have a cylindrical shape, the rotor shaft 12 penetrates through the inside of the combustor casing 151, and the combustor casing 151 has a cylindrically shaped space (casing) that accommodates the plurality of combustors 15.

The plurality of combustors 15 are arranged in the rotor circumferential direction. The plurality of combustors 15 include sixteen combustors 15, for instance, arranged at regular intervals in the rotor circumferential direction.

Each of the plurality of combustors 15 has a combustion cylinder 153 and a transition piece 155. It is possible to supply a fuel to the combustion cylinders 153 with compressed air produced by the compressor 13, and combustion gas is produced through combustion of the fuel. The combustion cylinder 153 is formed to have a cylindrical shape, and the axis of the combustion cylinder is disposed along the rotor axial direction. The opening at an end of the combustion cylinder 153 is an air supply port 157, and the air supply port 157 is disposed to face the discharge outlet 139 of the compressor 13. The transition piece 155 is capable of guiding combustion gas produced by the combustion cylinder 153 from the combustion cylinder 153 to the turbine 17.

In the above described combustor 15, as the high-pressure and high-temperature compressed air flows into the combustion cylinder 153 through the air supply port 157, the compressed air is mixed with the fuel injected from the main combustion burner, forming a swirl flow of pre-mixed gas.

The turbine 17 is capable of generating a rotational force of the rotor shaft 12 utilizing combustion gas. The turbine 17 has a turbine casing 171, a plurality of stages of stator vane assemblies 1, and a plurality of stages of turbine rotor blades 175. The turbine casing 171 is formed to have a cylindrical shape, the rotor shaft 12 penetrates through the inside of the turbine casing 171, and the turbine casing 171 has a cylindrically shaped space (casing) that accommodates the stator vane assemblies 1 and the turbine rotor blades 175. Furthermore, the turbine casing 171 has an exhaust chamber 177 at the downstream side of the air flow direction. The exhaust chamber 177 has an exhaust diffuser 179, and is capable of discharging exhaust gas after generating the rotational force of the rotor shaft 12. The plurality of stages of stator vane assemblies 1 are fixed to the inner side of the turbine casing 171, in a state of being arranged in the rotor axial direction and the rotor circumferential direction centered at the axis of the rotor shaft 12. The plurality of stages of turbine rotor blades 175 are fixed to the outer circumference of the rotor shaft, in a state of being arranged in the rotor axial direction and the rotor circumferential direction centered at the axis of the rotor shaft 12 so as to be positioned alternately with the stator vane assemblies 1 in the rotor axial direction.

The rotor shaft 12 is supported to a bearing part 121 at the end portion at the compressor side, and supported to a bearing part 123 at the end portion at the exhaust chamber side. In this way, the rotor shaft 12 is rotatable about the axis of the rotor shaft 12. Furthermore, although not depicted, a driving shaft of a generator is coupled to the end portion of the rotor shaft 12 at the compressor side.

The above described gas turbine 10 takes in air through the intake port of the compressor 13, and the air passes through the plurality of stages of compressor stator vanes 133 and the plurality of stages of compressor rotor blades 135, thereby being compressed. Accordingly, air after passing through the compressor 13 turns into high-temperature and high-pressure compressed air. The high-temperature and high-pressure compressed air is supplied to the combustor 15 with a fuel, and high-temperature and high-pressure combustion gas is produced through combustion of the fuel. The combustion gas passes through the plurality of stages of stator vane assemblies 1 and the plurality of stages of turbine rotor blades 175 of the turbine 17, whereby the rotational force of the rotor shaft 12 is generated and the rotor shaft 12 is rotary driven. Then, the rotational force is applied to the generator coupled to the rotor shaft 12, whereby electric power is generated. Meanwhile, exhaust gas after rotary driving the rotor shaft 12 is discharged to the atmosphere as exhaust gas via an exhaust diffuser of the exhaust chamber.

The stator vane assemblies 1 of the gas turbine 10 according to the present embodiment is at least one stator vane assembly 1 of the above described plurality of stages of stator vane assemblies 1. In the following description, the stator vane assembly 1 of the third stage from the upstream side of the flow direction of combustion gas will be described as an example. Nevertheless, the stator vane assembly 1 of the gas turbine 10 according to the present invention is not limited to the stator vane assembly 1 of the third stage from the upstream side in the flow direction of combustion gas.

Figure 2:
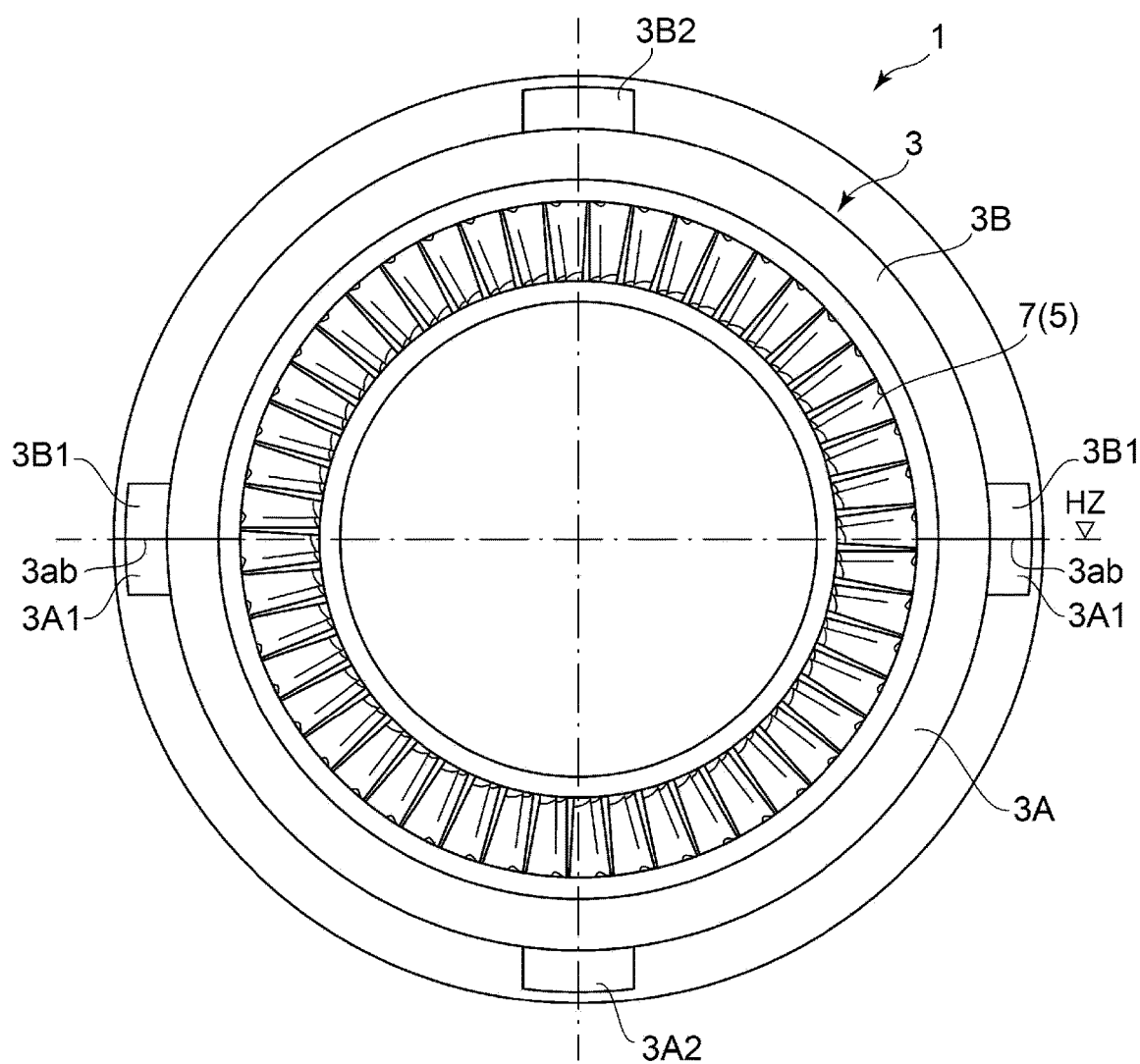
FIG. 2 is a front view of a stator vane assembly of a gas turbine according to an embodiment.

As depicted in FIG. 2, the stator vane assembly 1 of the gas turbine 10 according to the present embodiment includes a stationary member 3 formed to have an annular shape, and a plurality of stator vane segments 5 each including a shroud 6 (see FIG. 3) and a vane body 7.

The stationary member 3 is a member for placing a plurality of stator vane segments 5 (vane bodies 7) inside the turbine casing 171, and also referred to as a vane ring. The stationary member 3 is formed to have an annular shape, for instance, and disposed inside the turbine casing 171. The stationary member 3 includes at least two constituent members (stationary member segments) divided at a division surface 3*ab* extending in the radial direction of the stationary member 3. Nevertheless, the stationary member 3 may be divided into a larger number of constituent members in the circumferential direction.

In the example depicted in FIG. 2, the division surface 3*ab* is disposed on the horizontal plane HZ extending in the radial direction of the stationary member 3, and the above described at least two constituent members include a lower half part 3A and an upper half part 3B divided at the division surface 3*ab*. In the example depicted in FIG. 2, the opening edge portion of the lower half part 3A (circumferential-direction end portion of the lower half part 3A) and the opening edge portion of the upper half part 3B (the circumferential-direction end portion of the upper half part 3B) have flanges 3A1 and 3B1, respectively. The flange 3B1 disposed on the upper half part 3B has a through hole 3B12 formed thereon, and the flange 3A1 disposed on the lower half part 3A has a screw hole 3A12 disposed thereon (see FIG. 5). A bolt BT inserted into the through hole 3B12 of the flange 3B1 of the upper half part 3B engages with the screw hole 3A12 disposed on the flange 3A1 of the lower half part 3A, and thereby the upper half part 3B is joined to the lower half part 3A. In the example depicted in FIG. 2, dummy flanges 3A2 and 3B2 are disposed at the center in the circumferential direction of the lower half part 3A and the center in the circumferential direction of the upper half part 3B, respectively, to balance the deformation amount due to thermal expansion between the flanges 3A1, 3B1 disposed on the lower half part 3A and the upper half part 3B, respectively, As depicted in FIG. 2, the plurality of stator vane segments 5 are disposed along the circumferential direction of the stationary member 3 at radially inner side of the stationary member 3, a cavity CV is disposed between the shrouds 6 and the stationary member 3 (see FIG. 4), and the shrouds 6 are adjacent to one another in the circumferential direction of the stationary member 3 (see FIG. 5).

Figure 3:
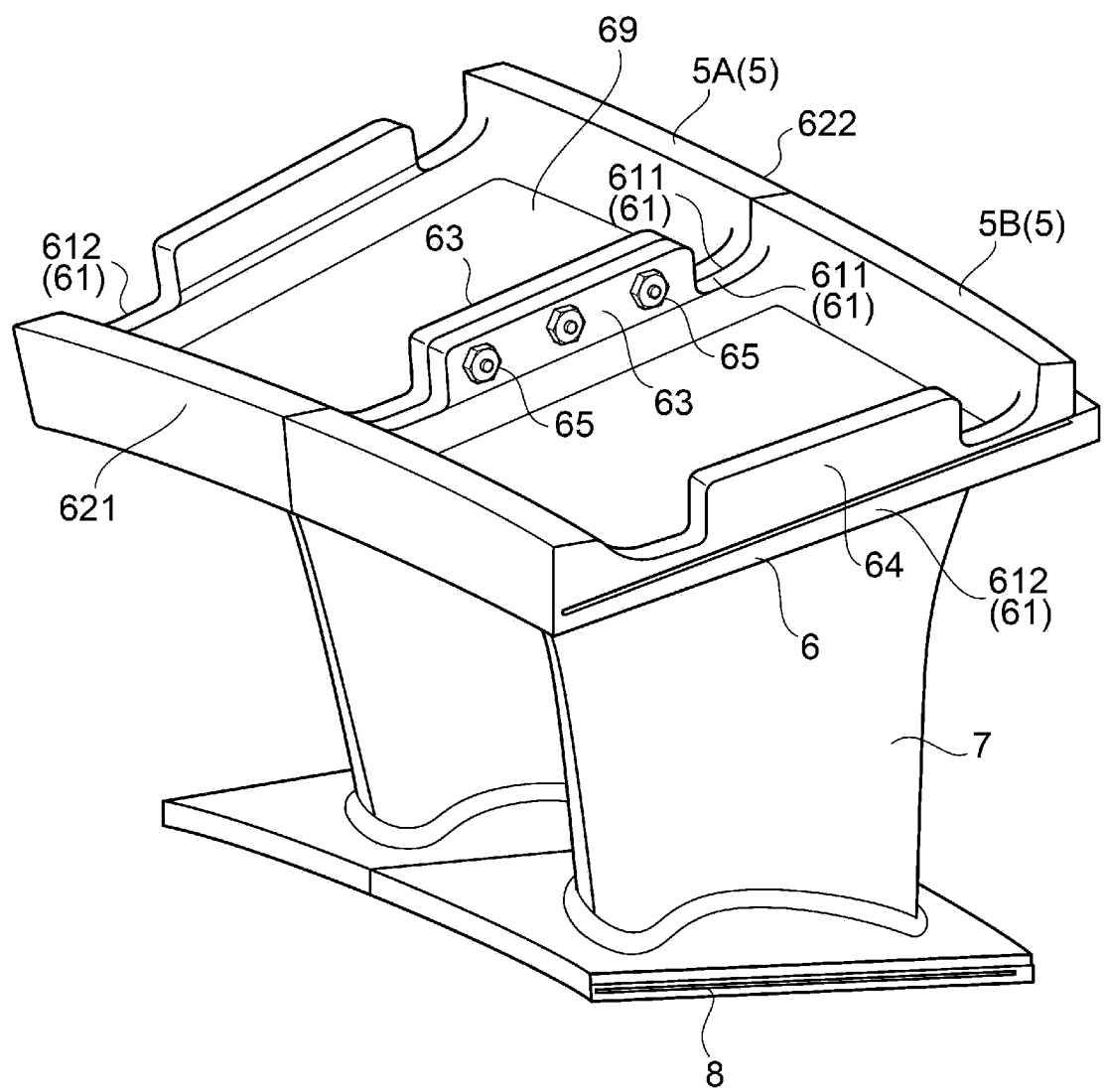
FIG. 3 is a perspective view of a segment shown in FIG. 2.

As depicted in FIG. 3, each of the plurality of stator vane segments 5 has one vane body 7 for a single shroud 6. Nevertheless, two or more vane bodies 7 may be provided for a single shroud 6. The shroud 6 is a partition wall disposed along the radially inner side of the stationary member 3, and the vane body 7 is a stator vane extending inward in the radial direction of the stationary member 3 from the shroud 6. The tip end of the vane body 7 (the radially inner end of the stationary member 3) has an inner shroud 8 whose diameter is smaller than that of the shroud 6 (hereinafter, referred to as "outer shroud 6"). Accordingly, in each of the plurality of stator vane segments 5, the vane body 7 is disposed between the outer shroud 6 and the inner shroud 8.

In the example depicted in FIG. 3, the two stator vane segments 5A, 5B whose outer shrouds 6 are arranged adjacent to one another in the circumferential direction of the stationary member 3 are fastened to one another to form a pair, and disposed along the circumferential direction of the stationary member 3 at the radially inner side of the stationary member 3. The outer shrouds 6 of the two stator vane segments 5A, 5B fastened to one another to form a pair each have a fastening end portion 611 which is a circumferential-direction end portion 61 at the fastening surface side of the outer shroud 6, and a seal end portion 612 which is a circumferential-direction end portion 61 opposite to the fastening surface of the outer shroud 6. Furthermore, a fastening portion 63 is disposed on the fastening end portion 611 of the outer shroud 6, and a protruding end portion 64 is disposed on the seal end portion of the outer shroud.

Figure 7A:
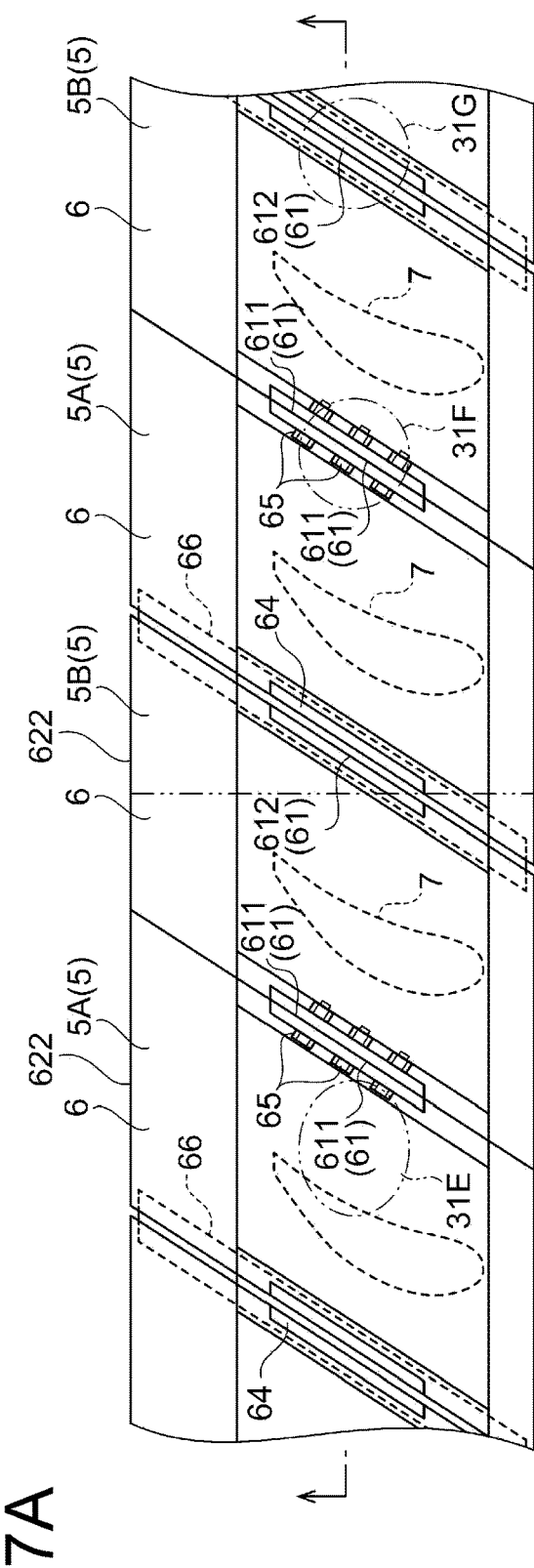
FIG. 7 is an enlarged developed view showing a part of the stator vane assembly of a gas turbine depicted in FIG. 5.
Figure 7B:
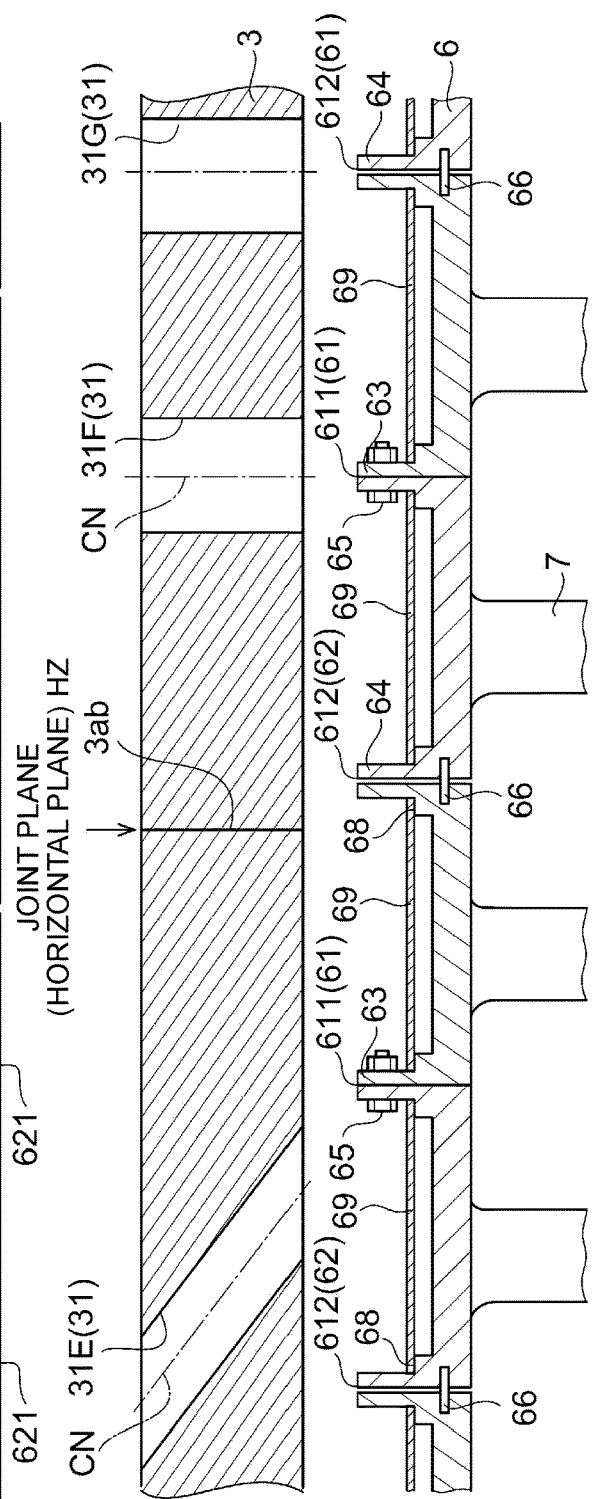

The fastening portions 63 disposed on the respective outer shrouds 6 adjacent to one another are fastened to one another via a fastening member 65, and the seal end portions 612 of the outer shrouds 6 adjacent to one another are connected to one another via a seal member 66 (see FIGS. 6 and 7). The fastening member 65 includes a bolt and a nut, for instance, but not limited thereto. The seal member 66 is a seal plate, for instance, and fit into a groove formed on the seal end portion 612, but not limited thereto.

Furthermore, the outer shroud 6 of each stator vane segment 5 has a front-end side mounting portion 621 and a rear-end side mounting portion 622. The front-end side mounting portion 621 is disposed at the radially outer side (the side facing the radially inner side of the stationary member 3) of the front end portion of the outer shroud 6, and the rear-end side mounting portion 622 is disposed at the radially outer side of the rear end portion.

Figure 4:
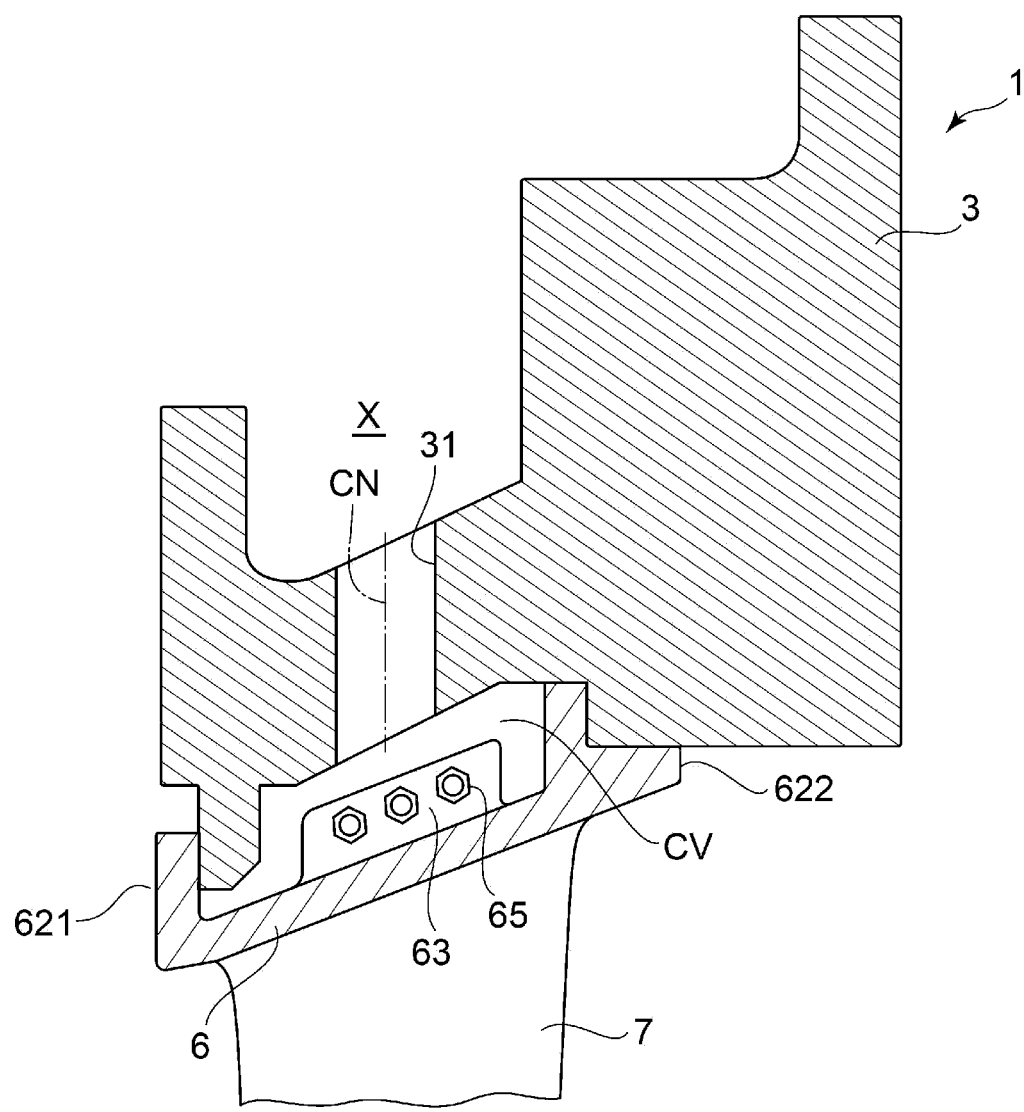
FIG. 4 is an enlarged vertical cross-sectional view showing a part of the stator vane assembly of a gas turbine depicted in FIG. 2.

As depicted in FIG. 4, the front-end side mounting portion 621 is a portion mounted on the front end portion of the stationary member 3, disposed along the front end portion of the outer shroud 6, isolating the cavity CV having an annular shape disposed between the stationary member 3 and the outer shroud 6 from combustion gas. The rear-end side mounting portion 622 is a portion mounted to the vicinity of the middle of the stationary member 3 in the axial direction, disposed along the rear end portion of the outer shroud 6, isolating the cavity CV from combustion gas.

The cavity CV has an annular shape extending in the circumferential direction centered at the axis C of the rotor shaft of the gas turbine 10, and is in communication with the space X disposed between the stationary member 3 and the turbine casing 171 (see FIG. 1) via a hole 31 penetrating through the stationary member 3 described below. Accordingly, the air extracted from the compressor 13 and supplied to the space X passes through the hole 31 penetrating through the stationary member 3 to be supplied to the cavity CV.

Furthermore, the outer shroud 6 has an impingement plate mounting step portion 68 (see FIGS. 6 and 7). The impingement plate mounting step portion 68 is a step portion for mounting an impingement plate 69 to a surface of the outer shroud 6 facing the cavity CV (surface at the radially outer side of the outer shroud 6), and is disposed to have a frame shape inside the front-end side mounting portion 621, the rear-end side mounting portion 622, the fastening portion 63 and the protruding end portion 64.

Figure 5:
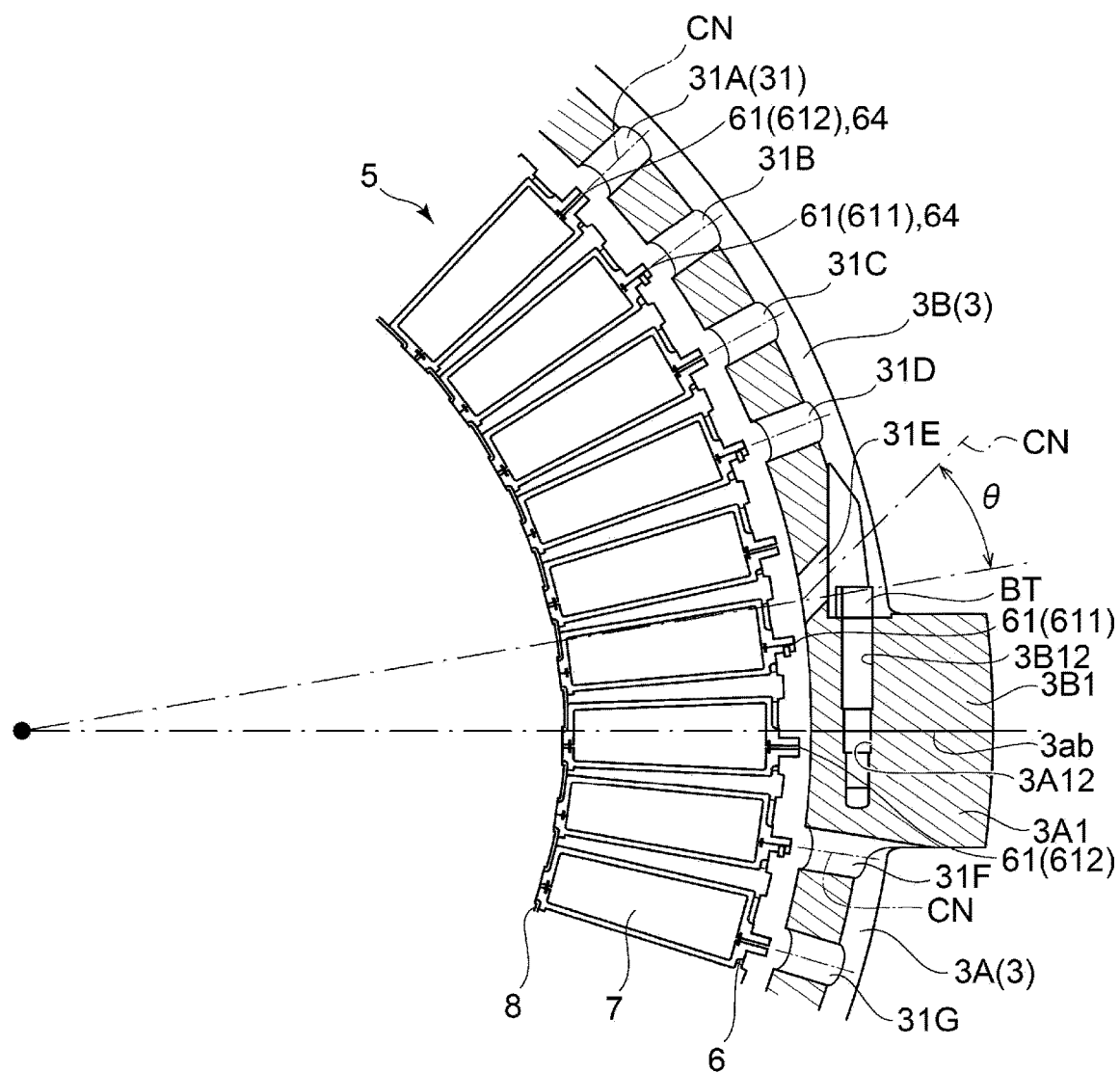
FIG. 5 is an enlarged lateral cross-sectional view showing a part of the stator vane assembly of a gas turbine depicted in FIG. 4.

As depicted in FIGS. 5 to 7, in the stator vane assembly 1 of the gas turbine 10 according to the present embodiment, the stationary member 3 has a hole 31 penetrating through the stationary member 3 from the outer side toward the inner side in the radial direction. The hole 31 is not limited to a hole whose center axis CN is a straight line, but may be a hole whose center axis CN is bended or curved. The center axis CN of the hole 31 is oriented toward the circumferential-direction end portion 61 of the outer shroud 6 from the radially outer side of the stationary member 3. In a case where the center axis CN of the hole 31 is bended or curved as described above, if the center axis CN is oriented toward the circumferential-direction end portion 61 of the outer shroud 6 at the inner circumferential side of the stationary member 3, the center axis CN is included in the center axis CN oriented toward the circumferential-direction end portion 61 of the outer shroud 6 from the radially outer side of the stationary member 3. Furthermore, the cross section of the hole 31 is not limited to a circular shape, but may be a non-circular shape, such as an oval, a rectangular, or a polygon, for instance, or may also be an asymmetric shape. In a case where the hole 31 has one of the above shapes, the center axis CN is an axis that passes through the gravity center of the shape. Furthermore, the cross-sectional shape of the hole 31 may not necessarily be constant in the extension direction of the hole 31, and may differ in the extension direction of the hole 31. For instance, the hole 31 may have an expanding shape (tapered shape) whose cross-sectional shape is greater at one end (inlet) than at the other end (outlet), or a narrowing shape (tapered shape) whose cross-sectional shape is smaller at one end than at the other end. The hole 31 is a hole for injecting air extracted from the compressor 13 (compressed air) toward the circumferential-direction end portion 61 of the outer shroud 6, and is also referred to as an air hole or a feed hole.

In the stator vane assembly 1 of the gas turbine 10 according to the present embodiment described above, the inner circumferential surface of the outer shroud 6 and the end surfaces of the plurality of outer shrouds 6 adjacent to one another in the circumferential direction are heated at the same time, and thus the circumferential-direction end portion 61 of the outer shroud 6 is heated from two sides and requires more cooling than other parts since the temperature is likely to increase more readily than the other parts.

According to the stator vane assembly 1 of the gas turbine 10 according to the present embodiment, the center axis CN of the hole 31 is oriented toward the circumferential-direction end portion 61 of the outer shroud 6 from the radially outer side of the stationary member 3. Thus, when the air (compressed air) is extracted from the compressor 13 and supplied to the space X at the radially outer side of the stationary member 3, the air passes through the hole 31 penetrating through the stationary member 3 from the radially outer side toward the radially inner side and is injected toward the circumferential-direction end portion 61 of the outer shroud 6. Accordingly, the circumferential-direction end portion 61 of the outer shroud 6 heated from two sides is cooled more intensively than other parts, and thus it is possible to efficiently cool the circumferential-direction end portion 61 of the outer shroud 6 that is heated from two sides.

As depicted in FIGS. 5 to 7, in the stator vane assembly 1 of the gas turbine 10 according to the present embodiment, the circumferential-direction end portion 61 of the outer shroud 6 includes a fastening end portion 611 fastened to the outer shroud 6 of the other stator vane assembly 1 adjacent to the outer shroud 6 via a fastening member 65.

In the stator vane assembly 1 of the gas turbine 10 according to the present embodiment described above, the circumferential-direction end portion 61 of the outer shroud 6 is heated from two sides as described above and needs to be cooled more intensively than other parts, and the fastening end portion 611 fastened by the fastening member 65 especially needs cooling. In the stator vane assembly 1 of the gas turbine 10 according to the present embodiment, the holes 31B, 31D, 31E, and 31F penetrating through the stationary member 3 from the radially outer side toward the radially inner side are oriented toward the fastening end portion 611 from the radially outer side of the stationary member 3. Thus, when the air (compressed air) extracted from the compressor 13 is supplied to the radially outer side of the stationary member 3, the air passes through the holes 31B, 31D, 31E, and 31F penetrating through the stationary member 3 from the radially outer side toward the radially inner side and is injected toward the fastening end portion 611 of the outer shroud 6, whereby it is possible to efficiently cool the fastening end portion 611 of the outer shroud 6 which especially needs cooling.

As depicted in FIGS. 5 to 7, in the stator vane assembly 1 of the gas turbine 10 according to the present embodiment, the circumferential-direction end portion 61 of the outer shroud 6 includes a seal end portion 612 connected to the outer shroud 6 of the other stator vane segment 5 adjacent to the outer shroud 6 via a seal member 66.

In the stator vane assembly 1 of the gas turbine 10 according to the present embodiment described above, while the circumferential-direction end portion 61 of the outer shroud 6 is heated from two sides as described above and needs to be cooled more intensively than other parts, the seal end portion 612 connected by the seal member 66 also needs cooling. In the stator vane assembly 1 of the gas turbine 10 according to the present embodiment, the holes 31A, 31C, and 31G penetrating through the stationary member 3 inward from the radially outer side are oriented toward the seal end portion 612 from the radially outer side of the stationary member 3. Thus, when the air (compressed air) is extracted from the compressor 13 and supplied to the radially outer side of the stationary member 3, the air passes through the holes 31A, 31C, and 31G penetrating inward from the radially outer side of the stationary member 3 and is injected toward the seal end portion 612 of the outer shroud 6, whereby it is possible to efficiently cool the seal end portion 612 of the outer shroud 6 which needs cooling.

As depicted in FIGS. 5 to 7, in the stator vane assembly 1 of the gas turbine 10 according to the present embodiment, the circumferential-direction end portion 61 of the outer shroud 6 includes a protruding end portion 64 protruding toward the stationary member. The protruding end portion 64 is, for instance, a protruding end portion disposed on the fastening portion 63 or the seal end portion 612 disposed on the outer shroud 6, but not limited thereto.

In the stator vane assembly 1 of the gas turbine 10 according to the present embodiment described above, the circumferential-direction end portion 61 of the outer shroud 6 is heated from two sides as described above and needs to be cooled more intensively than other parts, and the protruding end portion 64 protruding toward the stationary member also needs cooling. In the stator vane assembly 1 of the gas turbine 10 according to the present embodiment, the hole penetrating inward from the radially outer side of the stationary member 3 is oriented toward the protruding end portion 64 of the outer shroud 6. Thus, when the air (compressed air) extracted from the compressor 13 is supplied to the radially outer side of the stationary member 3, the air passes through the hole 31 penetrating inward from the radially outer side of the stationary member 3 and is injected toward the protruding end portion 64 of the outer shroud 6, whereby it is possible to efficiently cool the protruding end portion 64 of the outer shroud 6 which needs cooling.

As depicted in FIGS. 5 to 7, in the stator vane assembly 1 of the gas turbine 10 according to the present embodiment, the inner openings of the holes 31A to 31D, 31F, 31G penetrating through the stationary member 3 from the radially outer side toward the radially inner side overlap with the circumferential-direction end portion 61 of the outer shroud 6 in the circumferential direction of the stationary member 3 when seen in the radial direction of the stationary member 3.

According to the stator vane assembly 1 of the gas turbine 10 according to the present embodiment described above, the air extracted from the compressor 13 is injected toward the circumferential-direction end portion 61 of the outer shroud 6 from the inner openings of the holes 31A to 31D, 31F, and 31G penetrating the stationary member 3 from the radially outer side to the radially inner side. Thus, it is possible to efficiently cool the circumferential-direction end portion 61 of the outer shroud 6 heated by combustion gas.

As depicted in FIG. 5, in a case where the stationary member 3 includes the lower half part 3A and the upper half part 3B divided by the division surface 3ab disposed on the horizontal plane HZ extending in the radial direction of the stationary member 3, the opening edge portion of the lower half part 3A and the opening edge portion of the upper half part 3B are provided with the flanges 3A1 and 3B1, respectively. The flange 3B1 disposed on the upper half part 3B has a through hole 3B12 formed thereon, and the flange 3A1 disposed on the lower half part 3A has a screw hole 3A12 disposed thereon. A bolt BT inserted into the through hole 3B12 of the flange 3B1 of the upper half part 3B engages with the screw hole 3A12 disposed on the flange 3A1 of the lower half part 3A, and thereby the upper half part 3B is joined to the lower half part 3A. Thus, at the flange 3A1 disposed on the lower half part 3A and the flange 3B1 disposed on the upper half part 3B, it is not possible to provide a hole penetrating through the stationary member 3 from the radially outer side toward the radially inner side.

In the stator vane assembly 1 of the gas turbine 10 according to the present embodiment, in a case where the stationary member 3 is divided into a plurality of pieces in the circumferential direction of the stationary member 3, of the holes 31 penetrating through the stationary member 3, the center axis CN of the hole 31E adjacent to the division surface 3ab of the stationary member 3 is inclined to the side of the division surface 3ab of the stationary member 3 toward the radially inner side of the stationary member 3.

For instance, as depicted in FIG. 5, in a case where the stationary member 3 includes two constituent members divided by the division surface 3ab extending in the radial direction of the stationary member 3, of the holes penetrating through the stationary member 3, the center axis CN of the hole 31E adjacent to the division surface 3ab in the circumferential direction of the stationary member 3 is inclined to the side of the division surface 3ab of the stationary member 3 toward the radially inner side of the stationary member 3.

According to the stator vane assembly 1 of the gas turbine 10 according to the present embodiment described above, the air extracted from the compressor 13 passes through the hole 31E adjacent to the division surface 3ab in the circumferential direction of the stationary member 3 and is injected toward the circumferential-direction end portion 61 of the outer shroud 6 disposed at the radially inner side of the division surface 3ab. Thus, it is possible to effectively cool the circumferential-direction end portion 61 of the outer shroud 6 disposed at the radially inner side of the division surface 3ab in the circumferential direction of the stationary member 3.

In the examples depicted in FIGS. 5 to 7, as depicted in FIG. 7, the stator vane segment 5 is disposed such that the seal end portion 612 of the outer shroud 6 crosses the division surface 3ab, and as depicted in FIG. 5, the hole 31E oriented toward the fastening end portion 611 of the outer shroud 6 closest to the division surface 3ab is inclined by θ with respect to the radial direction of the stationary member 3. Thus, when the air (compressed air) extracted from the compressor 13 is supplied to the radially outer side of the stationary member 3, the air passes through the hole 31E and is injected toward the fastening end portion 611 of the outer shroud 6 closest to the division surface 3ab, and thus it is possible to efficiently cool the fastening end portion 611 of the outer shroud 6 closest to the division surface 3ab.

As depicted in FIG. 5, in the stator vane assembly 1 of the gas turbine 10 according to the present embodiment, the hole 31 penetrating through the stationary member 3 includes a plurality of holes 31 disposed in the circumferential direction of the stationary member 3. The plurality of holes 31 include holes (first holes) 31A to 31D, 31F to 31G whose center axis CN is disposed in the radial direction of the stationary member 3, and a hole (second hole) 31E whose center axis CN is oblique with respect to the radial direction of the stationary member 3, and inclined to the side of the division surface 3ab of the stationary member 3 toward the radially inner side of the stationary member 3.

According to the stator vane assembly 1 of the gas turbine 10 according to the present embodiment described above, the air extracted from the compressor 13 passes through the first holes 31A to 31D, 31F to 31G and the second hole 31E and is injected. Thus, it is possible to effectively cool the circumferential-direction end portion 61 of the outer shroud 6 disposed at the radially inner side of the division surface 3ab of the stationary member segments (the lower half part 3A, the upper half part 3B).

As depicted in FIG. 5, the stationary member segment (the lower half part 3A, the upper half part 3B) of the gas turbine 10 according to the present embodiment is divided into a plurality of segments in the circumferential direction of the stationary member 3 formed to have an annular shape, thereby constituting the stationary member 3. The stationary member segment (the lower half part 3A, the upper half part 3B) has a plurality of holes 31 penetrating through the stationary member segment (the lower half part 3A, the upper half part 3B) from the radially outer side toward the radially inner side in the circumferential direction of the stationary member segment (the lower half part 3A, the upper half part 3B). The plurality of holes 31 include holes (first holes) 31A to 31D, 31F to 31G whose center axis CN is disposed in the radial direction of the stationary member segment (the lower half part 3A, the upper half part 3B), and a hole (second hole) 31E whose center axis CN is oblique with respect to the radial direction of the stationary member segment (the lower half part 3A, the upper half part 3B), and inclined to the side of the division surface 3ab of the stationary member segment (the lower half part 3A, the upper half part 3B) toward the radially inner side of the stationary member 3.

According to the stationary member segment (the lower half part 3A, the upper half part 3B) according to the present embodiment described above, the air extracted from the compressor 13 passes through the holes 31A to 31D, 31F to 31G and the second hole 31E and is injected. Thus, it is possible to effectively cool the circumferential-direction end portion 61 of the outer shroud 6 disposed at the radially inner side of the division surface 3ab of the stationary member segment (the lower half part 3A, the upper half part 3B).

As depicted in FIG. 2, in the stator vane assembly 1 of the gas turbine 10 according to the present embodiment, the stationary member 3 has a plurality of stationary member segments (the lower half part 3A, the upper half part 3B) divided into a plurality of segments in the circumferential direction. The stationary member segment (the lower half part 3A, the upper half part 3B) has dummy flanges 3A2, 3B2 protruding outward in the radial direction from the surface at the outer side in the circumferential direction (outer circumferential surface). Herein, each of the stationary member segment (the lower half part 3A, the upper half part 3B) of the stationary member 3 may have a dummy flange 3A2, 3B2, or at least one of the stationary member segment (the upper half part 3B (the lower half part 3A)) may have a dummy flange (3A3B).

Figure 8:
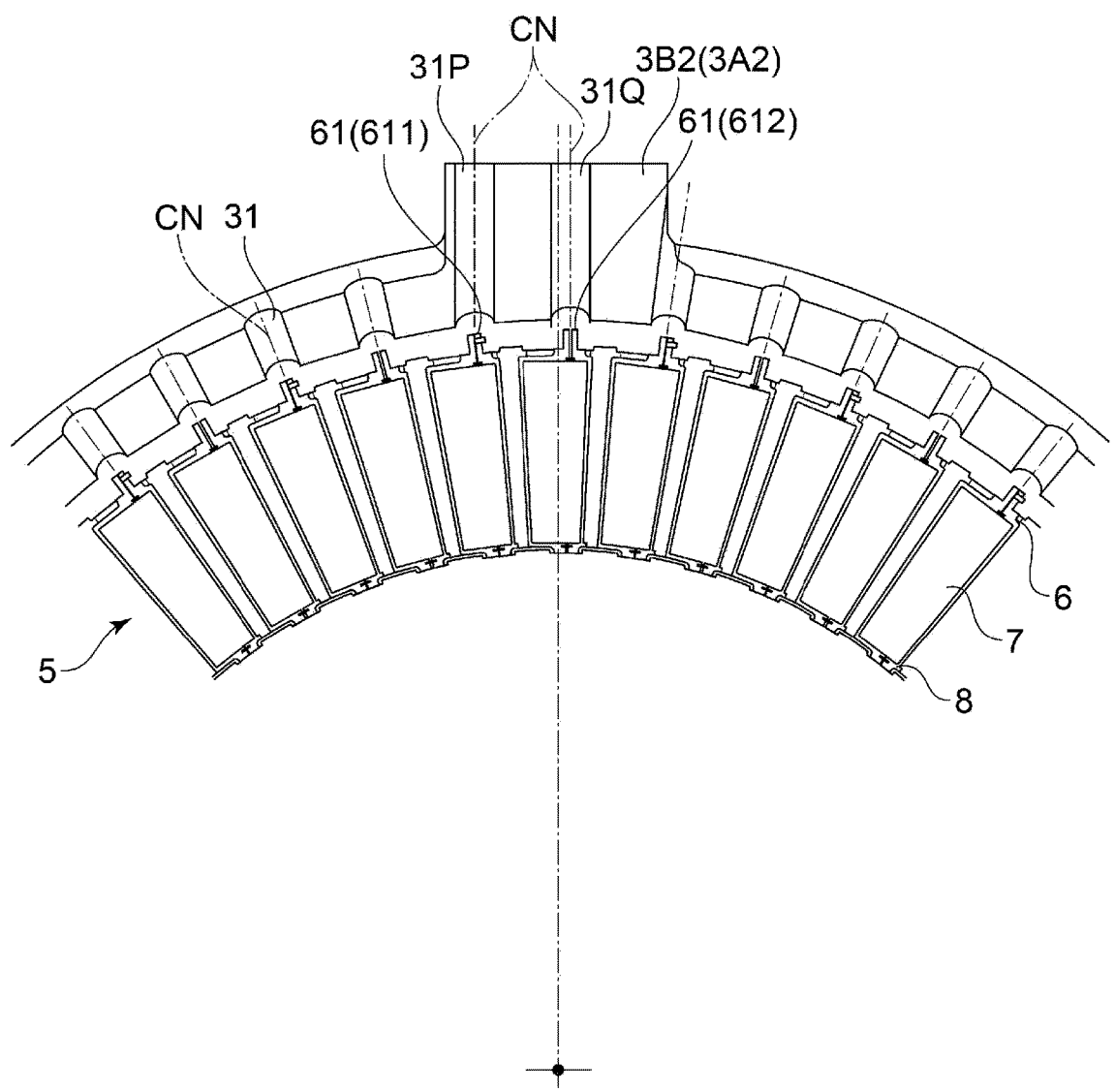
FIG. 8 is an enlarged lateral cross-sectional view showing a part of the stator vane assembly of a gas turbine depicted in FIG. 2.

As depicted in FIG. 8, the center axes CN of the holes 31P, 31Q disposed on the dummy flange 3B2 (3A2) are inclined with respect to the radial direction of the stationary member 3.

According to the stator vane assembly 1 of the gas turbine according to the present embodiment described above, the air extracted from the compressor 13 passes through the holes 31P, 31Q disposed on the dummy flanges 3B2 (3A2) and inclined with respect to the radial direction of the stationary member 3 and is injected. Thus, it is possible to effectively cool the circumferential-direction end portion 61 of the outer shroud 6 disposed at the radially inner side of the dummy flange 3B2 (3A2).

In the example depicted in FIG. 8, the first hole 31P disposed on the dummy flange 3B2 (3A2) of the stationary member 3 is disposed so as to be parallel to the vertical plane (a plane orthogonal to the horizontal plane HN) extending in the radial direction of the stationary member 3 toward the fastening end portion 611 of the outer shroud 6. Thus, when the air (compressed air) extracted from the compressor 13 is supplied to the space X at the radially outer side of the stationary member 3, the air passes through the first hole 31P and is injected toward the fastening end portion 611 of the outer shroud 6 disposed at the radially inner side of the dummy flange 3B2 (3A2), and thus it is possible to efficiently cool the fastening end portion 611 of the outer shroud 6 disposed at the radially inner side of the dummy flange 3B2 (3A2). Furthermore, in the example depicted in FIG. 8, the second hole 31Q disposed on the dummy flange 3B2 (3A2) of the stationary member 3 is disposed so as to be parallel to the vertical plane (a plane orthogonal to the horizontal plane HN) extending in the radial direction of the stationary member 3 toward the seal end portion 612 of the outer shroud 6. Thus, when the air (compressed air) extracted from the compressor 13 is supplied to the radially outer side of the stationary member 3, the air passes through the second hole 31Q and is injected toward the seal end portion 612 of the outer shroud 6 disposed at the radially inner side of the dummy flange 3B2 (3A2), and thus it is possible to effectively cool the seal end portion 612 of the outer shroud 6 disposed at the inner side of the dummy flange 3B2 (3A2).

Figure 9:
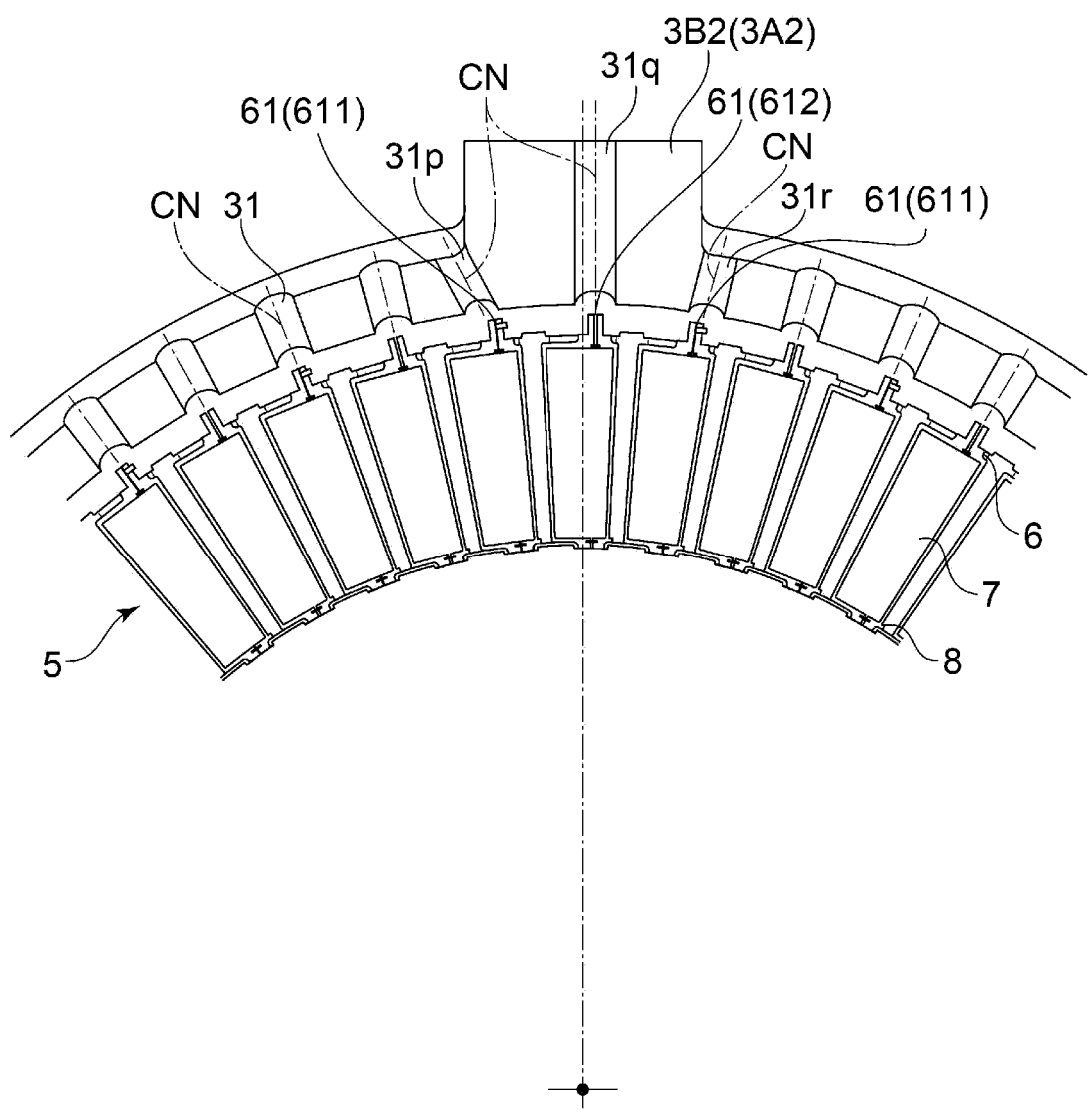
FIG. 9 is an enlarged lateral cross-sectional view showing a part of the stator vane assembly of a gas turbine according to an embodiment.

As depicted in FIG. 9, in the stationary member 3 having a hole 31 at a position offset from the dummy flange 3B2 (3A2), the center axes CN of the holes $31p$, $31r$ adjacent to the dummy flanges 3B2 (3A2) are inclined to the side of the dummy flange 3B2 (3A2) toward the radially inner side of the stationary member 3.

According to the above configuration, the air extracted from the compressor 13 passes through the holes $31p$, $31r$ adjacent to the dummy flange 3B2 (3A2) whose center axes CN are inclined to the side of the dummy flange 3B2 (3A2) toward the radially inner side of the stationary member 3 and is injected. Thus, it is possible to effectively cool the circumferential-direction end portion 61 of the outer shroud 6 disposed at the radially inner side of the dummy flanges 3B2 (3A2).

In the example depicted in FIG. 9, the holes $31p$, $31r$ disposed at a position offset from the dummy flange 3B2 (3A2) is disposed so as to be inclined to the vertical plane (a plane orthogonal to the horizontal plane HN) extending in the radial direction of the stationary member 3 toward the fastening end portion 611 of the outer shroud 6. Thus, when the air (compressed air) extracted from the compressor 13 is supplied to the space X at the radially outer side of the stationary member 3, the air passes through the holes $31p$, $31r$ and is injected toward the fastening end portion 611 of the outer shroud 6 disposed at the radially outer side of the dummy flange 3B2 (3A2), and thus it is possible to effectively cool the fastening end portion 611 of the outer shroud 6 disposed at the radially outer side of the dummy flange 3B2 (3A2). Furthermore, in the example depicted in FIG. 9, the hole $31q$ disposed on the dummy flange 3B2 (3A2) of the stationary member 3 is disposed so as to be parallel to the vertical plane (a plane orthogonal to the horizontal plane HN) extending in the radial direction of the stationary member 3 toward the seal end portion 612 of the outer shroud 6. Thus, when the air (compressed air) extracted from the compressor 13 is supplied to the space X at the radially outer side of the stationary member 3, the air passes through the first hole $31q$ and is injected toward the seal end portion 612 of the outer shroud 6 disposed at the radially inner side of the dummy flange 3B2 (3A2), and thus it is possible to effectively cool the seal end portion 612 of the outer shroud 6 disposed at the inner side of the dummy flange 3B2 (3A2).

A method of producing the stator vane assembly 1 of the gas turbine 10 according to the present embodiment is a method of producing the stator vane assembly 1 of the above described gas turbine 10 and includes arranging the stator vane segment 5 such that the center axis CN of the hole 31 penetrating through the stationary member 3 from the radially outer side toward the radially inner side is oriented toward the circumferential-direction end portion 61 of the outer shroud 6. Accordingly, the stator vane segment 5 is disposed on the stationary member 3 such that the circumferential-direction end portion of the outer shroud 6 is positioned on an extension line of the hole 31 of the stationary member 3.

According to the method of producing the stator vane assembly 1 of the gas turbine 10 according to the present embodiment, the stator vane segment 5 is disposed such that the center axis CN of the hole 31 penetrating through the stationary member 3 from the radially outer side to the radially inner side is oriented toward the circumferential-direction end portion 61 of the outer shroud 6. Thus, the air extracted from the compressor 13 passes through the hole 31 penetrating through the stationary member 3 from the radially outer side to the radially inner side and is injected toward the circumferential-direction end portion 61 of the outer shroud 6. Accordingly, it is possible to cool the circumferential-direction end portion 61 of the outer shroud 6 heated by combustion gas effectively.

Figure 10:
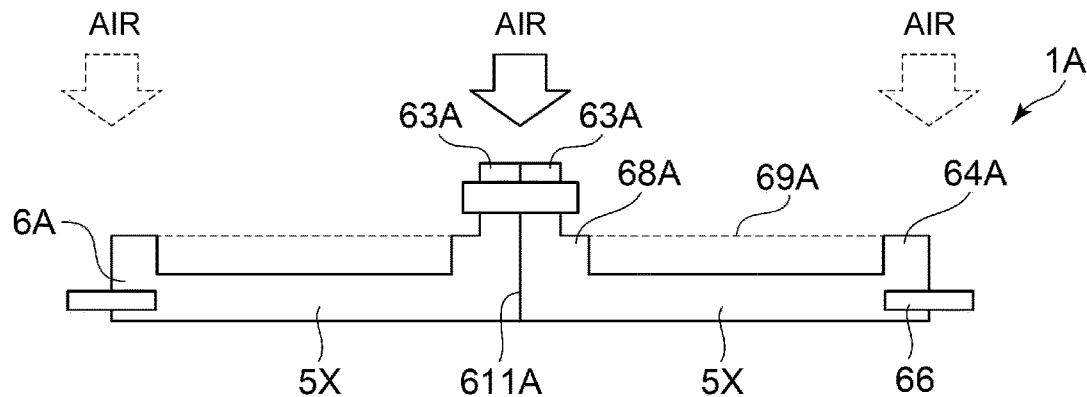
FIG. 10 is a diagram schematically showing an example (Example 1) of a segment applicable to a stator vane assembly of a gas turbine according to an embodiment.
Figure 11:
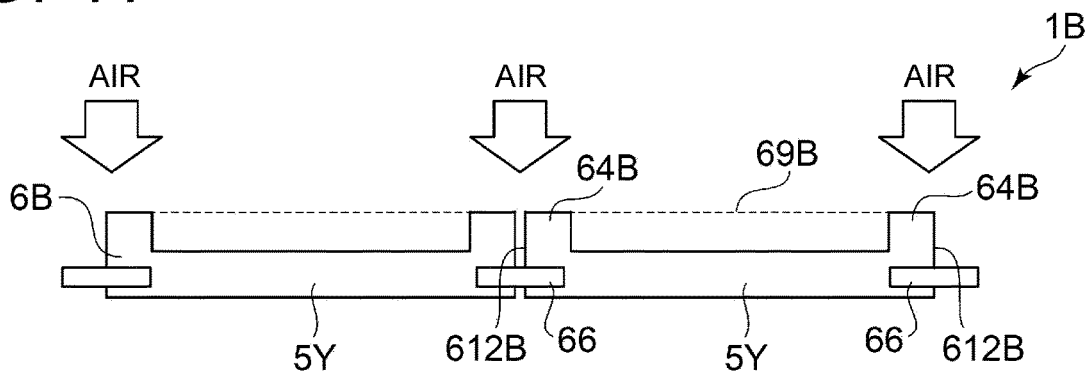
FIG. 11 is a diagram schematically showing an example (Example 2) of a segment applicable to a stator vane assembly of a gas turbine according to an embodiment.
Figure 12:
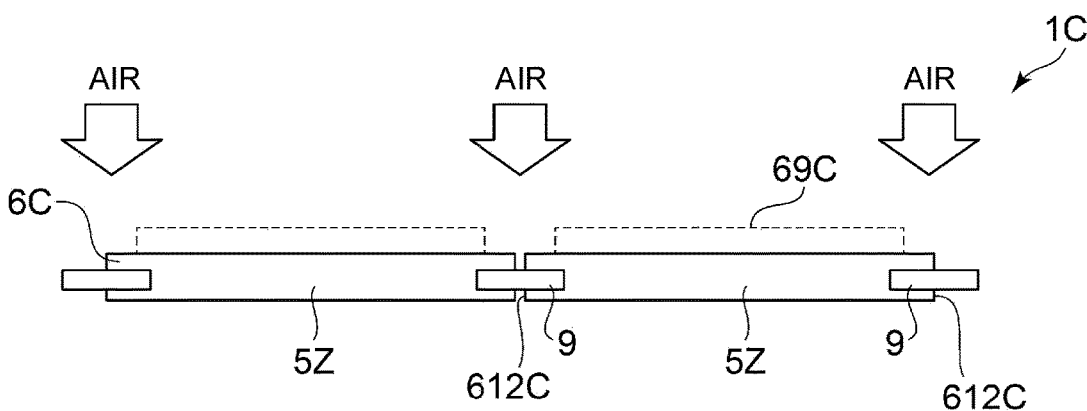
FIG. 12 is a diagram schematically showing an example (Example 3) of a segment applicable to a stator vane assembly of a gas turbine according to an embodiment.

FIGS. 10 to 12 are each a development view showing the stator vane segment 5X, 5Y, 5Z applicable to the stator vane assembly 1A, 1B, 1C of the gas turbine 10 according to an embodiment. While illustrated in a linear shape in FIGS. 10 to 12 for the sake of convenience, the outer shroud 6A, 6B, 6C is formed to have an arc shape along the inner circumference of the stationary member 3.

The stator vane segment 5X depicted in FIG. 10 is a stator vane segment including a fastening portion 63A at one side, and a protruding end portion 64A at the other side, of the circumferential-direction end portion 61A of the outer shroud 6A. The impingement plate mounting step portion 68A for mounting the impingement plate 69A is disposed at the inner side of the fastening portion 63A.

Although not depicted, in the stator vane assembly 1A of the gas turbine 10 including such a stator vane segment 5X, the stationary member has a hole penetrating through the stationary member from the radially outer side toward the radially inner side from the radially outer side of the stationary member toward the fastening end portion 611A. In the stator vane assembly 1A of the gas turbine 10, the air extracted from the compressor 13 is injected toward the fastening end portion 611A of the outer shroud 6A, and thus it is possible to efficiently cool the fastening end portion 611A of the outer shroud 6 which especially needs cooling. Furthermore, although not depicted, in the stator vane assembly 1A of the gas turbine 10, the stationary member may further include a hole penetrating through the stationary member from the radially outer side toward the radially inner side from the radially outer side of the stationary member toward the protruding end portion 64A. In the stator vane assembly 1A of the gas turbine 10, the air extracted from the compressor 13 is injected toward the protruding end portion 64A in addition to the fastening end portion 611A of the outer shroud 6A, and thus it is possible to efficiently cool the protruding end portion 64 which needs cooling in addition to the fastening end portion 611A of the outer shroud 6A which especially needs cooling.

The stator vane segment 5Y depicted in FIG. 11 is a stator vane segment including a protruding end portion 64B disposed on each of the seal end portions 612B of the outer shroud 6B, and the impingement plate 69A is disposed so as to bridge the protruding end portions 64B.

Although not depicted, in the stator vane assembly 1B of the gas turbine 10 including such a stator vane segment 5Y, the stationary member has a hole penetrating through the stationary member from the radially outer side toward the radially inner side from the radially outer side of the stationary member toward the protruding end portion 64B. In the stator vane assembly 1B of the gas turbine 10, the air extracted from the compressor 13 is injected toward the protruding end portion 64B of the outer shroud 6B, and thus it is possible to efficiently cool the protruding end portion 64B of the outer shroud 6B which needs cooling.

In the stator vane segment 5Z depicted in FIG. 12, the seal end portion 612C of the outer shroud 6C has the same thickness as the other parts (not a protruding end portion protruding toward the stationary member). An impingement plate 69C formed to have a box shape is disposed on the stator vane segment 5Z such that the opening faces downward.

Although not depicted, in the stator vane assembly 1C of the gas turbine 10 including such a stator vane segment 5Z, the stationary member has a hole penetrating through the stationary member from the radially outer side toward the radially inner side from the radially outer side of the stationary member toward the seal end portion 612C. In the stator vane assembly 1C of the gas turbine 10, the air extracted from the compressor 13 is injected toward the seal end portion 612C of the outer shroud 6C, and thus it is possible to efficiently cool the seal end portion 612C of the outer shroud 6C which needs cooling.

Embodiments of the present invention were described in detail above, but the present invention is not limited thereto, and various amendments and modifications may be implemented.

For instance, the stator vane segment 5 is not limited to the configuration that a single vane body 7 is provided for a single shroud 6, but two or more (a plurality of) vane bodies 7 may be provided for a single shroud 6 in the circumferential direction as in blade groups.

The contents described in the above respective embodiments can be understood as follows, for instance.

[1] A stator vane assembly (1) of a gas turbine (10) according to an aspect includes: a stationary member (3) formed to have an annular shape; and a plurality of stator vane segments (5) each including a shroud (6) and a vane body (7), the plurality of stator vane segments (5) disposed along a circumferential direction of the stationary member (3) at a radially inner side of the stationary member (3) such that a cavity (CV) is disposed between the shrouds (6) and the stationary member (3) and the shrouds (6) are disposed adjacent to one another in the circumferential direction of the stationary member (3). The stationary member (3) has a hole which penetrates through the stationary member (3) from a radially outer side toward the radially inner side, and a center axis (CN) of the hole (31) is oriented toward a circumferential-direction end portion (61) of the shroud (6).

According to the stator vane assembly (1) of the gas turbine (10) according to the present disclosure, the air extracted from the compressor (13) is injected toward the circumferential-direction end portion (61) of the shroud (6) through the hole (31) penetrating through the stationary member (3) from the radially outer side toward the radially inner side. Thus, it is possible to effectively cool the part heated from two sides by combustion gas, that is, the circumferential-direction end portion (61) of the shroud (6).

[2] A stator vane assembly (1) of a gas turbine (10) according to another aspect is the stator vane assembly (1) of a gas turbine (10) described in the above [1], and the circumferential-direction end portion (61) of the shroud (6) includes a fastening end portion (65) fastened to another shroud (6) adjacent to the shroud (6) via a fastening member (65).

With the above configuration, the air extracted from the compressor (13) passes through the hole (31B, 31D, 31E, 31F) penetrating through the stationary member (3) from the radially outer side toward the radially inner side and is injected toward the fastening end portion (611) of the shroud (6). Thus, it is possible to effectively cool the fastening end portion (611) of the shroud (6) heated from two sides by combustion gas.

[3] A stator vane assembly (1) of a gas turbine (10) according to another aspect is the stator vane assembly (1) of a gas turbine (10) described in the above [1] or [2], and the circumferential-direction end portion (61) of the shroud (6) includes a seal end portion (612) connected to another shroud (6) adjacent to the shroud (6) via a seal member (66).

With the above configuration, the air extracted from the compressor (13) passes through the hole (31A, 31C, 31G) penetrating through the stationary member (3) from the radially outer side toward the radially inner side and is injected toward the seal end portion (612) of the shroud (6). Thus, it is possible to effectively cool the seal end portion (612) of the shroud (6) heated from two sides by combustion gas.

[4] A stator vane assembly (1) of a gas turbine (10) according to another aspect is the stator vane assembly (1) of a gas turbine (10) described in any one of the above [1] to [3], and the circumferential-direction end portion (61) of the shroud (6) includes a protruding end portion (64) protruding toward the stationary member.

With the above configuration, the air extracted from the compressor (13) passes through the hole (31) penetrating through the stationary member (3) from the radially outer side toward the radially inner side and is injected toward the protruding end portion (64) of the shroud (6). Thus, it is possible to effectively cool the protruding end portion (64) of the shroud (6) heated from two sides by combustion gas.

[5] A stator vane assembly (1) of a gas turbine (10) according to another aspect is the stator vane assembly (1) of a gas turbine (10) described in any one of the above [1] to [4], and an opening of the hole (31A to 31D, 31F, 31G) at the radially inner side overlaps with the circumferential-direction end portion (61) of the shroud (6) in the circumferential direction when seen in a radial direction of the stationary member (3).

With the above configuration, the air extracted from the compressor (13) passes through the hole (31A to 31D, 31F, 31G) penetrating through the stationary member (3) from the radially outer side toward the radially inner side and is injected toward the circumferential-direction end portion (61) of the shroud (6). Thus, it is possible to effectively cool the circumferential-direction end portion (61) of the shroud (6) heated from two sides by combustion gas.

[6] A stator vane assembly (1) of a gas turbine (10) according to another aspect is the stator vane assembly (1) of a gas turbine (10) described in any one of the above [1] to [5], and the stationary member (3) is divided into a plurality of pieces in the circumferential direction of the stationary member (3), and the hole (31) is a hole (31E) adjacent to a division surface of the stationary member (3) and the center axis (CN) of the hole (31E) is inclined to a side of the division surface (3ab) of the stationary member (3) toward the radially inner side of the stationary member (3).

With the above configuration, the air extracted from the compressor (13) passes through the hole (31E) adjacent to the division surface of the stationary member (3) and is injected toward the circumferential-direction end portion (61) of the shroud (6) disposed at the radially inner side of the division surface (3ab) in the circumferential direction of the stationary member (3). Thus, it is possible to efficiently cool the circumferential-direction end portion (61) of the shroud (6) disposed at the radially inner side of the division surface (3ab) in the circumferential direction of the stationary member (3).

[7] A stator vane assembly (1) of a gas turbine (10) according to another aspect is the stator vane assembly (1) of a gas turbine (10) described in any one of the above [1] to [5], and the hole includes a plurality of holes disposed in the circumferential direction of the stationary member, and the plurality of holes include: a first hole (31A to 31D, 31F to 31G) whose center axis (CN) of the hole is disposed in a radial direction of the stationary member; and a second hole (31E) whose center axis of the hole is oblique with respect to the radial direction of the stationary member and inclined to a side of a division surface of the stationary member toward the radially inner side of the stationary member.

With the above configuration, the air extracted from the compressor (13) passes through the first hole (31A to 31D, 31F to 31G) and the second hole (31E) and is injected. Thus, it is possible to efficiently cool the circumferential-direction end portion (61) of the shroud (6) disposed at the radially inner side of the division surface (3ab) of the stationary member segment (the lower half part 3A, the upper half part 3B).

[8] A stator vane assembly (1) of a gas turbine (10) according to another aspect is the stator vane assembly (1) of a gas turbine (10) described in any one of the above [1] to [5], and the stationary member includes a plurality of stationary member segments (the lower half part 3A, the upper half part 3B) divided in the circumferential direction, at least one of the plurality of stationary member segments (the lower half part 3A, the upper half part 3B) has a center protruding portion (dummy flange 3B2 (3A2)) protruding toward the radially outer side from a surface, at the radially outer side, of a center part in the circumferential direction, and the hole is a hole adjacent to the center protruding portion (dummy flange 3B2 (3A2)) and the center axis (CN) of the hole is inclined to a side of the center protruding portion (dummy flange 3B2 (3A2)) toward the radially inner side of the stationary member.

With the above configuration, the air extracted from the compressor (13) passes through the hole (31r, 31p) adjacent to the center protruding portion (the dummy flange 3B2 (3A2)) whose center axis (CN) is inclined to the side of the center protruding portion (dummy flange 3B2 (3A2)) toward the radially inner side of the stationary member and is injected. Thus, it is possible to effectively cool the circumferential-direction end portion of the shroud (6) disposed at the radially inner side of the center protruding portion (dummy flange 3B2 (3A2)).

[9] A stationary member segment (the lower half part 3A, the upper half part 3B) according to an aspect is a stationary member segment (the lower half part 3A, the upper half part 3B) constituting a stationary member (3) which is formed to have an annular shape and divided in a circumferential direction of the stationary member (3), and a plurality of holes (31) penetrating through the stationary member (the lower half part 3A, the upper half part 3B) from a radially outer side toward a radially inner side are disposed in the circumferential direction of the stationary member segment (the lower half part 3A, the upper half part 3B), the plurality of holes (31) include a first hole (31A to 31D, 31F to 31G) and a second hole (31E) disposed in the radial direction of the stationary member (3), and the second hole (31D) is inclined to a side of the division surface (3ab) of the stationary member segment (the lower half part 3A, the upper half part 3B) toward the radially inner side of the stationary member (3).

With the above configuration, the air extracted from the compressor (13) passes through the first hole (31A to 31D, 31F to 31G) and the second hole (31E) and is injected. Thus, it is possible to effectively cool the circumferential-direction end portion (61) of the shroud (6) disposed at the radially inner side of the division surface (3ab) of the stationary member segment (the lower half part 3A, the upper half part 3B).

[10] A method of producing a stator vane assembly (1) of a gas turbine (10) according to an aspect is a method of producing a stator vane assembly (1) of a gas turbine (10) including a stationary member (3) formed to have an annular shape; and a plurality of stator vane segments (5) each including a shroud (6) and a vane body (7), the plurality of stator vane segments (5) disposed along a circumferential direction of the stationary member (3) at a radially inner side of the stationary member (3) such that a cavity (CN) is disposed between the shrouds (6) and the stationary member (3) and the shrouds (6) are disposed adjacent to one another in the circumferential direction of the stationary member (3), and the method includes: arranging the stator vane segments (5) such that a center axis (CN) of a hole (31) disposed on the stationary member (3) which penetrates through the stationary member (3) from a radially outer side toward the radially inner side is oriented toward a circumferential-direction end portion (61) of the shroud (6).

According to the above production method, the stator vane segment (5) is disposed such that the center axis (CN) of the hole (31) penetrating the stationary member (3) from the radially outer side to the radially inner side is oriented toward the circumferential-direction end portion (61) of the shroud (6). Thus, the air extracted from the compressor (13) passes through the hole (31) penetrating through the stationary member (3) from the radially outer side toward the radially inner side and is injected toward the circumferential-direction end portion (61) of the shroud (6). Accordingly, it is possible to effectively cool the part heated from two sides by combustion gas, that is, the circumferential-direction end portion (61) of the shroud (6).

REFERENCE SIGNS LIST 1, 1A, 1B, 1C Stator vane assembly of gas turbine
3 Stationary member
3ab Division surface
3A Lower half part
3A1 Flange
3A12 Screw hole
3A2 Dummy flange (center protruding portion)
3B Upper half part
3B1 Flange
3B12 Through hole
3B2 Dummy flange (center protruding portion)
31, 31A to 31G, 31P, 31Q, 31p, 31q, 31r Hole
5, 5A, 5B, 5X, 5Y, 5Z Stator vane segment
6, 6A, 6B, 6C Outer shroud (shroud)
61 Circumferential-direction end portion
611, 611A Fastening end portion
612, 612B, 612C Seal end portion
621 Front-end side mounting portion
622 Rear-end side mounting portion
63, 63A Fastening portion
64, 64A, 64B Protruding end portion
65 Fastening member
66 Seal member
68 Impingement plate mounting step portion
69, 69A, 69B, 69C Impingement plate
7 Vane body
8 Inner shroud
10 Gas turbine
12 Rotor shaft
121, 123 Bearing part
13 Compressor
131 Compressor casing
133 Compressor stator vane
135 Compressor rotor blade
137 Intake port
139 Discharge port
15 Combustor
151 Combustor casing
153 Combustion cylinder
155 Transition piece
157 Air supply port
17 Turbine
171 Turbine casing
175 Turbine rotor blade
177 Exhaust chamber
179 Diffuser

The invention claimed is:

1. A stator vane assembly of a gas turbine, comprising:
a stationary member formed to have an annular shape; and
a plurality of stator vane segments each including a shroud and a vane body, the plurality of stator vane segments disposed along a circumferential direction of the stationary member at a radially inner side of the stationary member such that a cavity is disposed between the shrouds and the stationary member and the shrouds are disposed adjacent to one another in the circumferential direction of the stationary member,
wherein the stationary member has a hole which penetrates through the stationary member from a radially outer side toward the radially inner side, and a center axis of the hole is oriented toward a circumferential-direction end portion of the shroud such that an air passes through the hole and impinges directly onto the circumferential-direction end portion of the outer shroud.

2. The stator vane assembly of a gas turbine according to claim 1,
wherein the circumferential-direction end portion of the shroud includes a fastening end portion fastened to another shroud adjacent to the shroud with a fastening member.

3. The stator vane assembly of a gas turbine according to claim 1, wherein the circumferential-direction end portion of the shroud includes a seal end portion connected to another shroud adjacent to the shroud via a seal member.

4. The stator vane assembly of a gas turbine according to claim 1,
wherein the circumferential-direction end portion of the shroud includes a protruding end portion protruding toward the stationary member.

5. The stator vane assembly of a gas turbine according to claim 1,
wherein an opening of the hole at the radially inner side overlaps with the circumferential-direction end portion of the shroud in the circumferential direction when seen in a radial direction of the stationary member.

6. The stator vane assembly of a gas turbine according to claim 1,
wherein the hole includes a plurality of holes disposed in the circumferential direction of the stationary member, and
wherein the plurality of holes include:
a first hole whose center axis of the hole is disposed in a radial direction of the stationary member; and
a second hole whose center axis of the hole is oblique with respect to the radial direction of the stationary member and inclined to a side of a division surface of the stationary member toward the radially inner side of the stationary member.

7. The stator vane assembly of a gas turbine according to claim 1,
wherein the stationary member includes a plurality of stationary member segments divided in the circumferential direction,
wherein at least one of the plurality of stationary member segments has a center protruding portion protruding toward the radially outer side from a surface, at the radially outer side, of a center part in the circumferential direction, and
wherein the hole is a hole adjacent to the center protruding portion and the center axis of the hole is inclined to a side of the center protruding portion toward the radially inner side of the stationary member.

8. A stator vane assembly of a gas turbine, comprising:
a stationary member formed to have an annular shape; and
a plurality of stator vane segments each including a shroud and a vane body, the plurality of stator vane segments disposed along a circumferential direction of the stationary member at a radially inner side of the stationary member such that a cavity is disposed between the shrouds and the stationary member and the shrouds are disposed adjacent to one another in the circumferential direction of the stationary member,
wherein the stationary member has a hole which penetrates through the stationary member from a radially outer side toward the radially inner side, and a center axis of the hole is oriented toward a circumferential-direction end portion of the shroud,
wherein the stationary member is divided into a plurality of pieces in the circumferential direction of the stationary member, and
wherein the hole is a hole adjacent to a division surface of the stationary member and the center axis of the hole is inclined to a side of the division surface of the stationary member toward the radially inner side of the stationary member.

9. A stationary member segment of a gas turbine constituting a stationary member of the gas turbine which is a portion mounted on an outer shroud of each stator vane segment of the gas turbine and is formed to have an annular shape and divided in a circumferential direction of the stationary member,
wherein a plurality of holes penetrating through the stationary member from a radially outer side toward a radially inner side are disposed in the circumferential direction of the stationary member segment,
wherein the plurality of holes include a first hole and a second hole disposed at different angles from one another with respect to a radial direction of the stationary member,
wherein a center axis of the first hole is disposed in the radial direction of the stationary member such that an air passes through the first hole and impinges directly onto the circumferential-direction end portion of the outer shroud, and
wherein a center axis of the second hole is oblique with respect to the radial direction of the stationary member segment and inclined to a side of a division surface of the stationary member segment toward the radially inner side of the stationary member such that the air passes through the second hole and impinges directly onto the circumferential-direction end portion of the outer shroud.

10. A method of producing a stator vane assembly of a gas turbine comprising:
a stationary member formed to have an annular shape; and
a plurality of stator vane segments each including a shroud and a vane body, the plurality of stator vane segments disposed along a circumferential direction of the stationary member at a radially inner side of the stationary member such that a cavity is disposed between the shrouds and the stationary member and the shrouds are disposed adjacent to one another in the circumferential direction of the stationary member,
the method comprising:
arranging the stator vane segments such that a center axis of a hole disposed on the stationary member which penetrates through the stationary member from a radially outer side toward the radially inner side is oriented toward a circumferential-direction end portion of the shroud such that an air passes through the hole and impinges directly onto the circumferential-direction end portion of the outer shroud.

* * * * *